Nov. 5, 1940.   L. J. SAROSDY   2,220,288
STEAMBOAT RATCHET
Filed June 24, 1940
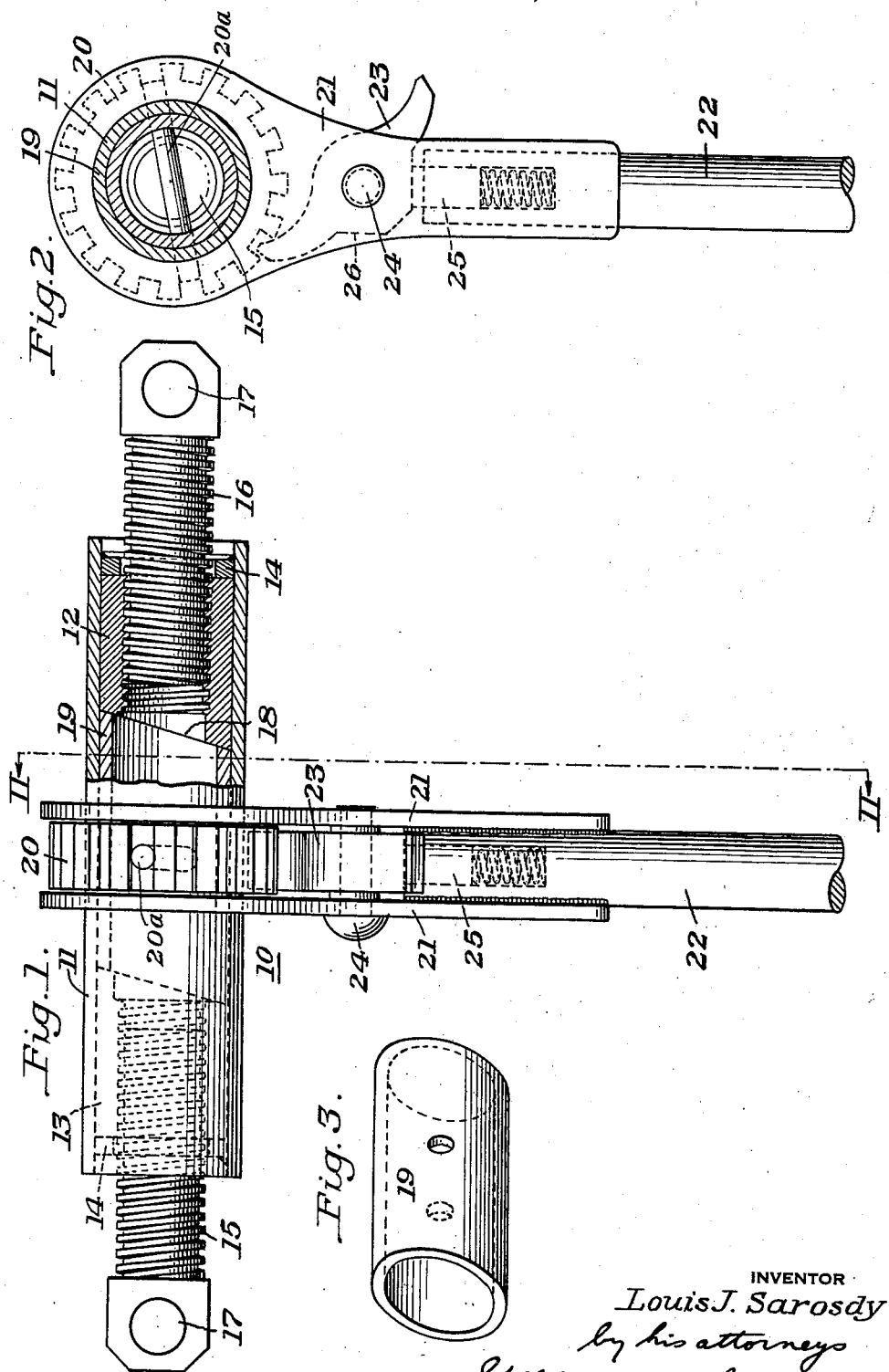
INVENTOR
Louis J. Sarosdy
by his attorneys
Stebbins and Blenko Patented Nov. 5, 1940

2,220,288

UNITED STATES PATENT OFFICE 2,220,288

STEAMBOAT RATCHET

Louis J. Sarosdy, Pittsburgh, Pa., assignor to Blaw-Knox Company, Pittsburgh, Pa., a corporation of New Jersey Application June 24, 1940, Serial No. 342,028

6 Claims. (Cl. 254—67)

This invention relates to a heavy-duty turnbuckle or screw-jack of the type generally designated by the term "steamboat ratchet."

Devices of this kind as heretofore constructed have usually included a tubular housing in the form of a short length of pipe, having nuts secured in each end thereof and screws threaded in the nuts, the housing being turned by a ratchet lever carried thereon. The nuts are secured in place by headless set screws threaded into radial holes drilled through the tubular housing and into the nuts themselves. In this construction, the entire load applied to the jack or turnbuckle is transmitted through the set screws and the latter are therefore subject to failure in shear or bending. At the same time, the wall of the tubular housing is also subject to failure because the load thereon is concentrated at the points where the set screws pass through it. Since the holes for the set screws must be tapped after the assembly of the nuts within the tubular housing in order that the thread be continuous through the housing wall and into the nuts, it is not feasible to replace the nuts when they have become worn, without drilling and tapping new holes in the field which is not always convenient.

I have invented a novel turnbuckle or jack of the steamboat-ratchet type which overcomes the aforementioned objections to such devices as previously made. In a preferred embodiment of the invention, I provide a tubular housing having a ratchet lever and nuts in each end thereof into which screws are threaded. Keeper rings secured in the ends of the tubular housing prevent the nuts from being pulled out of the tube when the turnbuckle is placed under tension. A spacer tube within the tubular housing engages the inner ends of the nuts and the abutting surfaces of these parts are so shaped that rotation of the spacer tube relative to the nuts tends to separate the latter. Such separation being limited by the keeper rings, the nuts are turned in unison with the spacer tube which is pinned to the housing tube.

The invention will be described in greater detail hereinafter with reference to the accompanying drawing illustrating the above-mentioned preferred embodiment, and the novel features and advantages will be more particularly pointed out and defined in the appended claims. In the drawing, Fig. 1 is a plan view partly in section along a longitudinal axial plane;

Fig. 2 is a sectional view taken along the plane of line II—II of Fig. 1 showing parts in elevation; and Fig. 3 is a perspective view of the spacer tube.

Referring now in detail to the drawing, the steamboat ratchet of my invention comprises a housing or tube 11 which may conveniently be a short length of pipe of suitable size having threaded sleeves or nuts 12 and 13 disposed therein adjacent the ends thereof. Keeper rings 14 are welded in the ends of the tube 11 to prevent withdrawal of the nuts when the device is subjected to tension.

The nuts are threaded interiorly in opposite directions, i. e., one has a right-hand thread and the other a left-hand thread. Screws 15 and 16 are suitably threaded for cooperation with the nuts and each has an eye 17 for attachment to a member to be actuated by the turnbuckle.

The inner ends of the nuts 12 and 13 are not cut off square but are beveled as indicated at 18, the ends of the nuts lying in a plane at an oblique angle to the axis thereof. A spacer tube 19 within the tube 11 has its ends beveled in the same manner, in order to abut closely the inner ends of the nuts. While the ends of the two nuts, as illustrated, are beveled to the same angle and in the same direction, this is not essential as the nuts may be beveled to different angles and in opposite directions.

A ratchet wheel 20 is disposed on the tube 11. A through pin 20a extends diametrically through the ratchet wheel 20, the tube 11 and the tube 19, thereby tying all these parts together for simultaneous rotation. Bearing plates 21 on opposite sides of the ratchet wheel 20 have holes therethrough to admit the tube 11 and are welded to a lever 22. A reversible, double-ended pawl 23 is pivoted on a pin 24 extending through the plates 21. A spring-pressed plunger 25 is disposed in a recess in the end of the lever 22 and bears against one or the other of flat surfaces 26 on the back of the pawl 23. The plunger 25 is thus effective to hold the pawl 23 either in the position in which it is illustrated or its alternative position indicated in chain lines in Fig. 2.

It will be apparent that by swinging the lever 22 back and forth, the ratchet wheel 20, the housing tube 11 and the spacer tube 19 may be rotated clockwise when the pawl is in the position shown in solid lines or counter-clockwise when in the alternative position.

When the ratchet wheel, the housing tube and the spacer tube are turned, as described, the nuts 12 and 13 are forced to turn with them, for the reason that any rotation of the spacer sleeve 19 relative to the nuts 12 and 13 would tend to force the nuts apart, because of the slope of the abutting surfaces of these parts relative to their common axis. Since separation of the nuts is prevented by the keeper rings 14, the nuts are forced to turn with the spacer tube.

When the screws 15 and 16 are subjected to tension, e. g., when the turnbuckle is used to pull two members together, the tension is transmitted from the screws to the nuts and thence by the keeper rings 14 to the housing tube 11. When the jack is subject to compression as when it is being used to force members apart, the thrust is transmitted from the screws through the nuts directly to the spacer tube 19. In all cases, therefore, the force exerted by the turnbuckle is applied directly to members suitable for sustaining it and the force is applied axially of such members. The tube 11 may conveniently be dimensioned to sustain a very heavy load in tension and the attachment of the keeper rings to the tube may be made such as to transmit the load safely. The spacer tube 19, furthermore, being short and rigid is well-suited to withstand compression loads. It will thus be understood that the construction disclosed has obvious advantages from the standpoint of strength, simplicity and low cost, over the conventional construction in which the set screws penetrating the housing tube and the nuts are relied on to transmit both tension and compression to the housing tube. A further advantage of the invention is that when the nuts become worn, they may be replaced in the field by removing one of the keeper rings, removing the worn nuts and inserting new ones, and then welding in a new keeper ring.

The stress in the housing tube 11 is distributed substantially uniformly around the circumference thereof when the turnbuckle is under tension so there is no likelihood of failure as a result of stress concentration, as in the conventional construction.

Although I have illustrated and described but a preferred embodiment of the invention, it will be understood that changes in the construction and arrangement of parts may be made without departing from the spirit of the invention or the scope of the appended claims.

I claim:

1. A steamboat ratchet comprising a tubular housing, a nut in each end of the housing, a screw threaded into each nut, abutments carried on the housing against which the nuts bear when the screws are subjected to tension, the inner ends of said nuts being at an oblique angle to the axis thereof, a spacer tube in said housing extending between said nuts, said spacer tube also having its ends at an oblique angle to its axis and engaging the inner ends of said nuts whereby to cause rotation thereof with said spacer tube, and means securing said spacer tube to said housing.

2. A screw-jack comprising a cylindrical housing, a cylindrical nut in each end of the housing, the inner ends of the nuts being cut off at an oblique angle to the axis thereof, a screw threaded into each nut, means on the housing engaged by the nuts when the screws are placed under tension, a spacer tube in said housing having its ends cut off at an oblique angle to its axis and engaging the inner ends of said nuts, and means securing said spacer tube to said housing.

3. In a turnbuckle, a housing tube, a nut in each end of the tube, the inner ends of said nuts being cut on a bevel, a spacer tube in said housing tube abutting said nuts and having its ends cut to conform to the inner ends of the nuts, means preventing the nuts from pulling out of the housing tube, a screw threaded in each nut, and means causing said spacer tube to rotate with the housing tube.

4. In a turnbuckle, a housing tube, a nut in each end of the tube, a spacer tube in the housing tube and between the inner ends of the nuts, abutments against which the nuts bear effective to prevent withdrawal of the nuts from the housing tube, a screw threaded into each nut, the nuts and the spacer tube having abutting cam surfaces tending to move the nuts outwardly on rotation of the spacer tube relative to the nuts, and means causing said spacer tube to rotate with said housing tube.

5. In a turnbuckle, a housing tube, a nut in each end of the tube, a spacer tube in the housing tube and between the inner ends of the nuts, abutments against which the nuts bear effective to prevent withdrawal of the nuts from the housing tube, a screw threaded into each nut, the nuts and the spacer tube having abutting surfaces at an oblique angle to the axis of the spacer tube, and means tying said spacer tube and said housing tube together for simultaneous rotation.

6. In a turnbuckle, a housing tube, a nut in each end of the tube, a spacer in the housing tube and between the inner ends of the nuts, means for locking the spacer against rotation relative to the tube, means for holding the nuts in the tube, a screw threaded into each nut, and means at the abutting ends of the nuts and spacer for locking them against relative rotation.

LOUIS J. SAROSDY.